United States Patent

Abbot

[15] 3,670,717
[45] June 20, 1972

[54] UNLIMITED QUANTITY OF POWER FROM SOLAR RADIATION SECURED WITH ZERO ATMOSPHERIC POLLUTION

[72] Inventor: Charles G. Abbot, 4409 Beechwood Road, Hyattsville, Md. 20782

[22] Filed: March 24, 1971

[21] Appl. No.: 127,638

[52] U.S. Cl. .............................................................126/270
[51] Int. Cl. .............................................................F24j 3/02
[58] Field of Search .............................126/270, 271; 136/89

[56] References Cited

UNITED STATES PATENTS

| | | | |
|---|---|---|---|
| 3,171,403 | 3/1965 | Drescher | 126/270 |
| 2,888,007 | 5/1959 | Tabor | 126/270 |
| 2,277,311 | 3/1942 | Freeman | 126/271 |
| 2,712,772 | 7/1955 | Trombe | 126/270 X |
| 3,376,165 | 4/1968 | Abbot | 126/270 X |

Primary Examiner—Charles J. Myhre
Attorney—Cameron, Kerkam & Sutton

[57] ABSTRACT

Solar radiation collected by a polar siderostat is reflected by a reflecting surface arranged at an angle to the beam from the polar siderostat of one-half of the latitude of the polar siderostat. The resulting horizontally disposed beam of solar radiation is then utilized by vertically disposed elements for heating air which heated air is thereafter converted to useful work.

4 Claims, 4 Drawing Figures

PATENTED JUN 20 1972 3,670,717
SHEET 1 OF 2
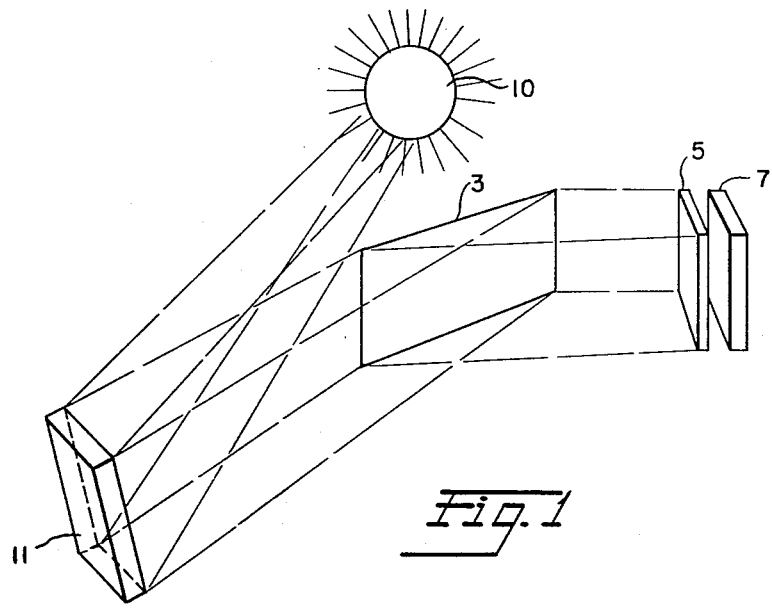
Fig.1
Fig.3
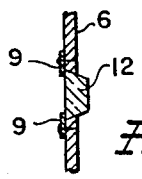
Fig.4
INVENTOR
CHARLES G. ABBOT
BY
*Cameron Kerkam + Sutton*
ATTORNEYS

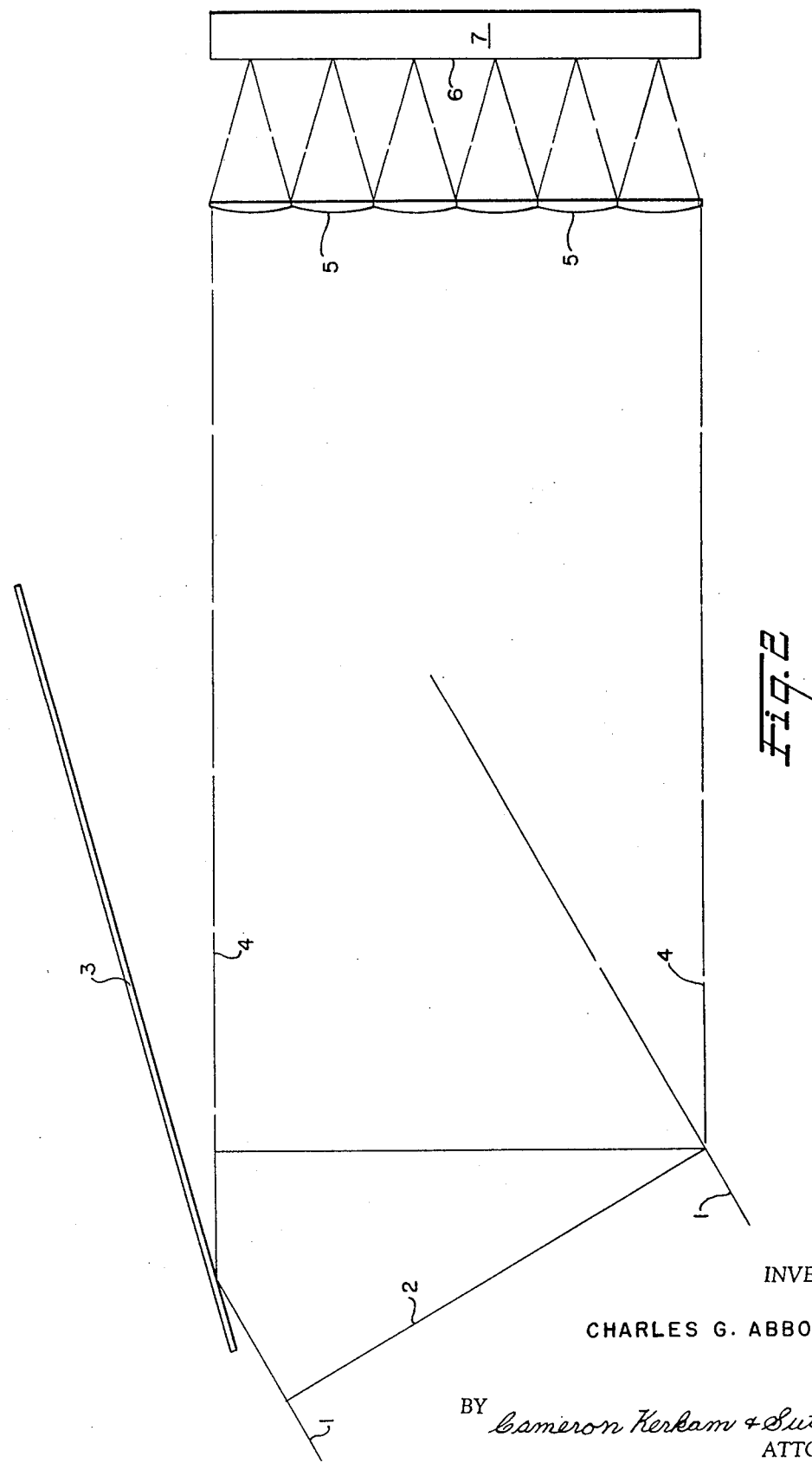
INVENTOR
CHARLES G. ABBOT
BY Cameron Kerkam & Sutton
ATTORNEYS

UNLIMITED QUANTITY OF POWER FROM SOLAR RADIATION SECURED WITH ZERO ATMOSPHERIC POLLUTION

CROSS REFERENCE TO RELATED APPLICATION

The present invention and application carries forward the invention described and claimed in my copending application Ser. No. 58,838 filed July 28, 1970, for Apparatus For Converting Solar Energy To Low Cost Power.

BACKGROUND OF THE INVENTION

The sciences of astronomy and mathematics, aided by the telescope and the spectroscope, present to the mind the Sun, travelling in the Universe, at the center of a sphere of radiation, carried with the Sun. Enclosed within this sphere of radiation is the Earth, surrounded by air and water, and heated by rays of the Sun. The rays are partly cut off by the Earth's envelope of air and water, and are partly reflected to space, and partly absorbed to maintain the Earth's temperature. Some areas of the Earth's surface receive and absorb nearly 100 percent of the Sun rays they intercept, notably oceanic areas. Other areas, such as arid plateau regions, reflect to space, or if their soil is suitable, are heated to high temperatures by Sun rays. Such areas are scarce and small along the Earth's equator, which is mainly covered by oceans or lush vegetation; but enormous areas, as for instance the deserts of North and South Africa; North and South America; Australia, and parts of Asia, present the possibility of collecting forever far more energy for mechanical and electrical power than can ever by needed by man. This prolific source requires no such work as do coal or oil to produce it, and brings with it no pollution of water or air.

The problem of obtaining unlimited power from solar radiation is solved in three stages. The first stage is discussed in U.S. Pat. No. 3,376,165 granted me on Apr. 2, 1968, a column of radiation about 4 feet square is isolated from the Sun's sphere of surrounding rays. This trapped radiant column parallel to the Earth's axis, preferably is located at the Equator, and follows the Sun's apparent motion at 15° per hour. Such a column rotates about its own axis, one complete rotation in 24 hours. With its axis unmoved on the Earth, it always includes a constant quantity of solar radiation, though never collecting the same rays twice.

The second stage is described in my pending patent application Ser. No. 58,838, filed July 28, 1970, shows the 4 foot square column of solar rays split by 36 lenses (preferably 8-inch square Fresnel lenses) whose foci enter a steel air-tight box, through small windows of difficulty fusible crystal, such as transparent sapphire. The box contains atmospheric air and thereby becomes a hot "black body", as solar rays continually thrust themselves into it. I have utilized three methods of converting the solar energy to power.

While the method disclosed in U.S. Pat No. 3,376,165 (by thermoelectric couples stationed at the foci of the lenses) produces a low voltage, the cones of solar rays may be sliced off at a selected height in the cones (FIG. 10 of this patent). Thus, space for perhaps a hundred thermoelectric couples is provided, instead of only one couple at each focus. This boosts the produced E.M.F. enough for cost competition with coal or oil for power.

The steel "black body" of my pending application, with its air charge may take the place of the steam chest of a steam engine equipped with cranks, valves and fly-wheels. The air heated above 1,000° by solar energy, is then converted into mechanical power just as the hot steam is in a steam engine. This is the most efficient method of the three which I have used.

As described in my application Ser. No. 58,838, powerful blasts of highly heated air from the ray chamber may be trained upon a fly-wheel, producing mechanical power as in turbine engines.

The third stage of the problem is that the most widely spread locations on Earth suitable to collect solar radiation are located between 10° of latitude and 35°, both North and South of the Equator. The great arid high-level plateaus in these latitudes receive Sun rays little weakened by atmospheric scattering and absorption, so that about 80 percent of the solar constant (which is 1.95 calories per square centimeter per minute) may be collected at nearly all longitudes on Earth. Solar power therefore is available to the power factories of the future in many locations where it may be readily distributed to all who require it.

However, collection of solar radiation in these latitudes poses a problem. The polar siderostat reflects its beam into a column whose axis is parallel to the axis of the Earth. Therefore, the collected columns are inclined in both hemispheres, to the inclination of the latitude of the siderostat. It would be awkward and costly to build solar power factories on foundations inclined 10° to 35° North and South latitude.

SUMMARY OF INVENTION

To solve this problem, I provide with each siderostat, a plane mirror adjusted to reflect the 4-foot square column of collected rays from the polar siderostat from having an inclination of the latitude of the location of the polar siderostat to a horizontal disposition. The horizontally disposed beam on solar radiation is then utilized in vertically disposed heat converting apparatus for useful work.

BRIEF DESCRIPTION OF THE DRAWINGS

In the accompanying drawings, in which like reference characters indicate like parts, a preferred embodiment of the present invention is shown for purposes of illustration. In these drawings FIG. 1 is a schematic view of the Sun, a polar siderostat, a mirror reflecting the beam from the polar siderostat to the horizontal and heat absorbing devices for converting the solar radiation to useful work;

FIG. 2 is an enlarged detail of FIG. 1 showing the mirror suitably disposed for the latitude of +30°;

FIG. 3 shows the disposition of the several Fresnel lenses; and

FIG. 4 is a detail of the mounting of the crystal to admit a concentrated beam of solar energy into "black body" air-tight box.

DESCRIPTION OF THE PREFERRED EMBODIMENT

The figures described above are drawn approximately as suitable for collecting solar radiation over an area of 4 × 4 feet at Earth's mean distance from the Sun. These figures are designed to clearly fix ideas, not precisely to maintain a perfectly exact scale.

Referring now to FIGS. 1, 2 and 3 of the present application, FIG. 1 shows the Sun 10 with rays collected by polar siderostat 11 and reflected by the mirror 3 to the horizontal with the horizontal beam received by Fresnel lenses 5 and concentrated on chamber or "black box" 7.

FIG. 2 shows dotted at the left the approximate width of column 1 of solar rays as collected by one polar siderostat 11 located at 30° North latitude, as viewed from East looking West horizontally. Reference 2 designates a right angle section of the column 1 of the solar rays, this section being far enough North of the siderostat mirror so as not to shade the long solar beam from the Sun to siderostat 11. A fixed thin plane mirror 3 is polished on its South side and is disposed at an angle of 15° from the top boundary of column 1. Mirror 3 deflects column 1, through an angle of 30° to a horizontal disposition and somewhat diminishes the width of the resulting horizontal column 4 without altering its East-West thickness. North of the South boundary of deflected horizontal column 4, column 4 is refracted by 36 Fresnel lenses 5 (FIG. 3) to face 6 of "black box" 7. Face 6 mounts 36 difficulty fusible sapphire windows 12 (FIG. 4) and the rays concentrated by the Fresnel lenses 5 pass through windows 8 into air-tight thin chamber 7 disposed in East-West orientation.

Referring to FIG. 4, conical, transparent window 8 of difficulty fusible sapphire crystal is there shown in approximate full size. It is forced by screws 9,9 to an air-tight fit in the South wall 6 of micro-steel chamber 7 shown in FIG. 1. As indicated in FIGS. 1 and 3, there are 36 refracted cones entering through crystal windows 12 to the one chamber 7 associated with each polar siderostat 11. The horizontal ray-column 4 is divided into 36 cones refracted by 8-inch Fresnel lenses which all come to foci lying in one East-West plane 6.

The air in "black box" 7 is intensely heated by the rays entering through windows 12. The heat energy thus provided may be utilized to perform useful work as described in my copending application, Ser. No. 58,838, referred to above, and the disclosure of that application is specifically incorporated herein to complete the present disclosure of suitable means for converting the heated air to mechanical energy and useful work.

What I claim is:

1. Apparatus providing mechanical and electric power in unlimited quantity from the Sun's radiation, comprising a polar siderostat and a fixed plane mirror away from said siderostat out of the solar beam to said siderostat deflecting the column of radiation reflected by said siderostat to a horizontal column of radiation, said fixed plane mirror being disposed at an inclination to the reflected column of radiation of one-half the angle of latitude of said siderostat.

2. Apparatus as described in claim 1 including an array of lenses to split the horizontal column of radiation into a plurality of parts, and refract said parts toward foci at the boundary of an air-filled chamber.

3. Apparatus as described in claim 2, said chamber having a side wall, and windows of difficulty fusible crystal in said side wall, said side wall having an area approximating the area of the cross-section of said horizontal column of radiation.

4. Apparatus as described in claim 3, said windows being conical transparent solid plugs of difficulty fusible crystal forced into air-tight engagement in said side wall of said chamber.

* * * * *